July 1, 1952        E. V. DARDANI        2,601,875
SWEEPSTICK FOR LOOMS AND SELF-ALIGNING BEARING THEREFOR
Filed July 17, 1950
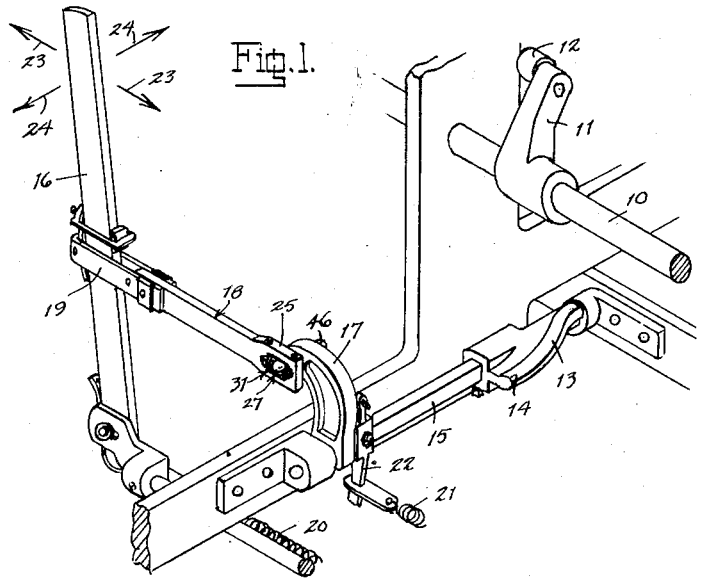
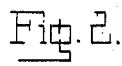
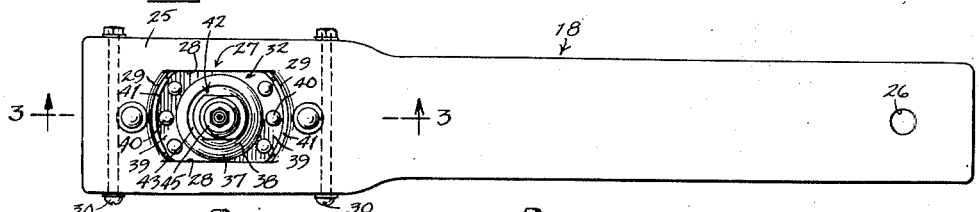
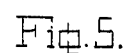
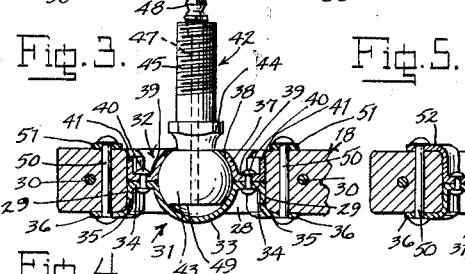
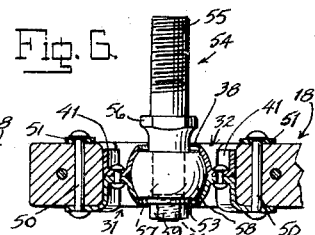
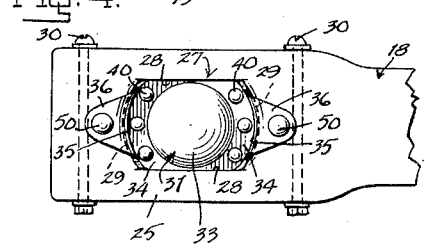
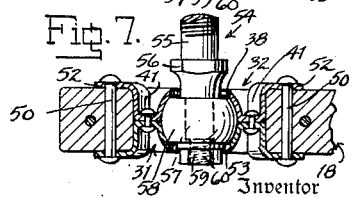
Inventor
EDWARD V. DARDANI
By
Attorney Patented July 1, 1952

2,601,875

UNITED STATES PATENT OFFICE 2,601,875

SWEEPSTICK FOR LOOMS AND SELF-ALIGNING BEARING THEREFOR

Edward V. Dardani, Fairfield, Conn.

Application July 17, 1950, Serial No. 174,161

11 Claims. (Cl. 139—151)

The present invention relates to improved sweepstick for looms and self-aligning bearing therefor, and has for an object to provide a sweepstick by means of which an improved pick action is obtained in the loom, and in which failure of the loom due to wear or breakage of the sweepstick is reduced to a minimum.

In a power loom the sweepstick is the link or connector between the picking cam and the picker stick for imparting swinging movement to the latter, the movement of the picker stick serving to impel or throw the shuttle across the raceway or lay of the loom. The shuttle must obtain its acceleration to carry it across the lay in only the relatively short distance through which the sweepstick and the picker stick move, and consequently the movement imparted to these parts by the cam must be very rapid and with great force, resulting in considerable impact strain on the sweepstick.

As a power loom operates at speeds ranging from 120 to 250 picks per minute the strain imposed upon the conventional sweepstick is severe and results in a comparatively short use before replacement is necessary due to breakage or wear. This is in part due to the fact that the sweepstick is formed of a shock-absorbing material rather than of metal, usually consisting of a length of hard close-grained wood, and in some cases of laminated rubber-impregnated fabric material. Furthermore, the loom mechanism is such that the picker stick, which is engaged at its upper end in the shuttle box at the end of the lay, must swing with the movement of the lay, so that in addition to its swinging movement to impel the shuttle it also swings with the lay at right angles to its shuttle impelling movement. Consequently the connection of the sweepstick with the cam mechanism must be such as to compensate for misalignment in the stud bearing. In the conventional sweepstick this misalignment is provided for by engaging the stud of the cam arm in an oversized hole in the sweepstick, and due to the repeated forward and rearward impact of the stud in the hole, it tends to become elongated longitudinally of the stick, this being the primary reason for frequent replacement of the sweepstick.

It is proposed in the present invention to provide an improved bearing between the stud and the sweepstick which is self-aligning to compensate for misalignment of the sweepstick, and further to provide a rigid connection of the bearing with the sweepstick designed to take the impact strain longitudinally of the stick in both forward and rearward direction, and to so distribute the strain to the shock-absorbing structure of the sweepstick that there will be little or no tendency to wear away the material of the sweepstick with consequent loosening of the bearing. It is further proposed to provide the impact absorbing structure of the bearing substantially in the central plane of the sweepstick, so that the impact force is most efficiently directed along the central axis of the sweepstick.

With the above and other objects in view, embodiments of the invention are shown in the accompanying drawings, and this embodiment will be hereinafter more fully described with reference thereto, and the invention will be finally pointed out in the claims.

In the drawings:

Fig. 1 is a perspective view showing the sweepstick in its cooperating relation with certain parts of the pick mechanism of a conventional loom.

Fig. 2 is a side elevation from the inner side of the sweepstick, according to one illustrated exemplary embodiment of the invention.

Fig. 3 is a horizontal sectional view, partially broken away, taken along the line 3—3 of Fig. 2.

Fig. 4 is a side elevation of the sweepstick, partially broken away, from the outer side.

Fig. 5 is a horizontal sectional view similar to Fig. 3 showing a modified form of the invention.

Fig. 6 is a similar view showing another modified form.

Fig. 7 is a similar view showing still another modified form.

Similar reference characters indicate corresponding parts throughout the several figures of the drawings.

While the invention is concerned with the sweepstick per se, the illustration in Fig. 1, showing the manner in which the sweepstick is incorporated in a conventional form of loom, will serve to bring out the peculiar movement to which the sweepstick is subjected and the severe impact strain imposed thereon. The cam shaft 10 is the lower shaft in the loom, and on it is fastened an arm 11 holding the rotating picking roll 12. As this casting and the cam shaft rotate, the picking roll strikes the picking cam shoe 13 at the point 14 and depresses it, and at the same time it turns the shoe and the picking shaft 15. This action moves the picker stick 16 to the right, when viewed from the left hand side of the loom, this movement being imparted thereto through the sweep arm 17 secured upon the picking shaft 15 and connected by a stud to one end of the sweepstick 18, the other end of the sweepstick being connected by a lug strap 19 to the picker stick 16. A spring 20 is attached to the lower end of the picker stick and a spring 21 is connected to an arm 22 secured upon the cam shaft 15, these springs serving to return the picker stick to its back position and the picker shaft to its original position. Thus the shuttle impelling movement of the picker stick is in the direction indicated by the arrows 23, while the swinging motion imparted thereto by the swinging of the lay is indicated by the arrows 24. The operation of picking takes place very rapidly in the loom with heavy impact force, and is the cause of much of the noise in a weave room.

The sweepstick 18 is in the form of a length of hard close-grained wood, such as hickory, although it may be of other suitable material designed to have a degree of shock-absorbing quality, and is preferably of increased width at its head end 25 which is connected to the sweep arm 17. At its other end it is provided with a hole 26 for attachment of the lug strap 19. The head end 25 is provided with an opening 27 having parallel upper and lower walls 28—28 which are parallel to the upper and lower edges of the head 25 and substantially in longitudinal line with the grain of the wood, and having circumferential end walls 29—29 concentric to the axial center of the opening, and which are disposed transversely of the grain of the wood so that the radii extending from said axial center of the opening beyond the end walls are in radiating lines diagonally intersecting the grain of the wood. The purpose of this is to provide for an even distribution of the impact force to the sweepstick, as will presently more fully appear.

At each side of the opening 27 there are provided through bolts 30—30 to reinforce the head end against splitting.

The self-aligning bearing comprises two complementary socket forming members indicated generally as 31 and 32, the member 31 consisting of a central semi-spherical socket portion 33, circumferential web portions 34—34 having their inner surface in the central plane of the bearing and projecting forwardly and rearwardly from the socket portion 33, circumferential abutment wall portions 35—35 adapted to engage and conform to the circumferential end walls 29 of the opening 27 of the sweepstick, and forwardly and rearwardly extending attaching apertured ear portions 36—36 adapted to engage the outer face of the sweepstick forwardly and rearwardly of the opening 27.

The member 32 comprises a central semi-spherical socket portion 37 complementary to the socket portion 33 and provided with a central aperture 38, circumferential web portions 39—39 extending forwardly and rearwardly from the socket portion having their inner surfaces in the central plane of the bearing and secured to the complementary web portions of the member 31 by rivets 40, and circumferential abutment wall portions 41—41 adapted to engage and conform to circumferential end walls 29 of the opening 27, these wall portions terminating within the opening 27 so that the assembled member 31 and 32 may be slipped into the opening 27 in assembling the bearing with the sweepstick.

Prior to securing together the socket members 31 and 32 a stud member, indicated generally as 42, is secured in the bearing, this stud member comprising a ball end 43 rotatably engaged for universal swiveling action with the complementary socket member 31 and 32, a flange portion 44 having flat sides for engagement by a wrench, and a threaded shaft portion 45 to a lubricant space within the socket the picker arm 17 where it is secured by a nut 46. In order to lubricate the bearing a passage 47 extends through the stud from a lubricant fitting 48 provided in the end of the shaft portion 45 to a lubricant space within the socket portion 33 provided by a flat surface 49 at the ball end of the stud.

The bearing is secured in the opening 27 by a pair of rivets 50—50 engaged at one end in the ears 36—36 of the socket member 31 and engaged at their other ends in washers 51—51 provided at the opposite side of the sweepstick.

In operation the driving impact from the pick shaft 15 is imparted by the stud directly to the web portions of the bearing disposed in the central plane of the sweepstick, and is then distributed through the relatively large circumferential surfaces of the spherical end walls of the bearing to the circumferential end walls 29 of the opening 27, so that the force of the impact is distributed in a substantially radial direction within the sweepstick in diagonally intersecting relation to the grain of the wood. Thus the tendency to split or wear the sweepstick through direct longitudinal impact thereon is reduced to a minimum, and the force of the impact is distributed over the entire area of the sweepstick in a manner to better absorb shock. This action takes place in any position of misalignment of the sweepstick with respect to the stud 42.

In Fig. 5 there is shown a modification of the invention in which the socket member 32 is provided with ears 52—52 which engage the sweepstick at the opposite side from the ears 36—36 of the socket member 31, the two pairs of ears being secured by the rivets 50—50. In this case the stud is assembled with the socket members at the same time the latter are assembled with the sweepstick.

In Figs. 6 and 7 there are shown modifications in which the socket member 31 is provided with an aperture 53 similar to the aperture 38 of the socket member 32. The stud, indicated generally as 54, comprises a shaft portion 55, a flange portion 56 having wrench engaging flats, and a stud portion 57 upon which a spherical surfaced ring 58 is secured by a nut 59 screwed upon the reduced threaded extension 60 of the stud portion 57. In the form of the invention shown in Fig. 6 the end walls 41—41 of the socket member 32 terminate within the opening 27, and washers 51—51 are provided for engagement by the rivets 50—50. In the embodiment shown in Fig. 7 the end walls 41—41 of the socket member 32 are provided with ears 52—52 for engagement by the rivets 50—50.

I have illustrated and described preferred and satisfactory embodiments of my invention, but it will be understood that changes may be made therein, within the spirit and scope thereof, as defined in the appended claims.

What is claimed is:

1. In combination, a sweepstick for looms, and sweepstick consisting of a length of shock-absorbing material, such as wood, having an end portion provided with a bearing-receiving opening having end walls transverse to the length of said sweepstick, and a bearing assembly engaged in said opening and comprising a pair of complementary socket-forming members joined together along the central plane of said opening and each having a central socket portion complementary one to the other to form a spherical socket, at least one of said socket-forming portions having a central stud-receiving opening, said members each having transverse abutment wall portions engaged with the end walls of said opening, and a ball end stud member engaged for swiveling movement in said spherical socket and extended outwardly therefrom through said stud-receiving opening.

2. The invention as defined in claim 1, further characterized in that said end walls and said abutment wall portions are circumferentially arranged concentric to the central axes of said bearing-receiving opening.

3. The invention as defined in claim 1, further characterized in that the bearing wall portions of at least one of said socket-forming members is provided with forwardly and rearwardly extended ear portions engaged with a face surface of said sweepstick, and securing means engaged with said ear portions and extended through said sweepstick.

4. The invention as defined in claim 1, further characterized in that the abutment walls of both of said socket-forming members are provided with forwardly and rearwardly extending ears engaged with the respective face surfaces of said sweepstick, and securing means engaged with said ears and extended through said sweepstick.

5. The invention as defined in claim 1, further characterized in that at least one of said socket-forming portions is of semi-spherical form.

6. The invention as defined in claim 1, further characterized in that at least one of said socket-forming portions is of semi-spherical form, and said ball end stud member has a flat surface at its ball end to provide with said socket portion a lubricant space.

7. The invention as defined in claim 1, further characterized in that at least one of said socket-forming portions is of semi-spherical form, and said ball end stud member has a flat surface at its ball end to provide with said socket portion a lubricant space, there being a lubricant passage through said stud member to said space.

8. The invention as defined in claim 1, further characterized in that both of said socket-forming portions have central stud receiving openings.

9. The invention as defined in claim 1, further characterized in that said bearing-receiving opening has straight longitudinal walls parallel to each other, and said bearing assembly has straight longitudinal edges parallel to each other and to said longitudinal edges of said opening.

10. The invention as defined in claim 1, further characterized in that said socket-forming members have web portions between their socket-forming portions and their abutment walls having their inner surfaces joined together in the central plane of said bearing-receiving opening.

11. For use with a sweepstick for looms, wherein said sweepstick consists of a length of shock-absorbing material such as wood, having an end portion provided with a bearing-receiving opening having end walls transverse to the length of said sweepstick, a bearing assembly adapted to be engaged in said opening and comprising a pair of complementary socket forming members joined together along a central plane and each having a central socket portion complementary one to the other to form a spherical socket, at least one of said socket forming portions having a central stud-receiving opening, said members each having transverse end wall portions adapted to engage the end walls of said opening, and a ball end stud member engaged for swiveling movement in said spherical socket and extended outwardly therefrom through said stud-receiving opening.

EDWARD V. DARDANI.

REFERENCES CITED

The following references are of record in the file of this patent:

UNITED STATES PATENTS

| Number | Name | Date |
| --- | --- | --- |
| 730,743 | Campbell | June 9, 1903 |
| 1,218,631 | De Monts | Mar. 13, 1917 |
| 2,110,105 | Burdett | Mar. 1, 1938 |